United States Patent
Yu

(10) Patent No.: US 9,730,010 B2
(45) Date of Patent: Aug. 8, 2017

(54) METHOD FOR PROVIDING GUIDANCE TO LOCATION OF VEHICLE USING SMART GLASSES AND APPARATUS FOR CARRYING OUT THE SAME

(71) Applicant: HYUNDAI MOTOR COMPANY, Seoul (KR)

(72) Inventor: Seong O Yu, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/709,374

(22) Filed: May 11, 2015

(65) Prior Publication Data

US 2016/0169687 A1 Jun. 16, 2016

(30) Foreign Application Priority Data

Dec. 15, 2014 (KR) ........................ 10-2014-0180525

(51) Int. Cl.
| | |
|---|---|
| *H04W 4/02* | (2009.01) |
| *B60R 25/33* | (2013.01) |
| *G01C 21/20* | (2006.01) |
| *G01C 21/36* | (2006.01) |

(52) U.S. Cl.
CPC ............. *H04W 4/02* (2013.01); *B60R 25/33* (2013.01); *G01C 21/20* (2013.01); *G01C 21/3685* (2013.01); *G01C 21/3688* (2013.01)

(58) Field of Classification Search
CPC ........... G01C 21/34; G01S 19/13; H04W 4/02
See application file for complete search history.

(56) References Cited

U.S. PATENT DOCUMENTS

| 2005/0128140 A1* | 6/2005 | Luo | B60R 25/00 |
| | | | 342/357.34 |
| 2008/0167806 A1* | 7/2008 | Wheeler | G01S 5/0027 |
| | | | 701/532 |
| 2012/0092129 A1* | 4/2012 | Lickfelt | B60R 25/24 |
| | | | 340/5.72 |
| 2014/0267400 A1* | 9/2014 | Mabbutt | G06T 19/006 |
| | | | 345/633 |
| 2016/0048249 A1* | 2/2016 | Chen | G06F 3/011 |
| | | | 701/2 |

FOREIGN PATENT DOCUMENTS

| JP | 2005-534269 A | 11/2005 |
| JP | 2005-346647 A | 12/2005 |
| JP | 2005-350916 A | 12/2005 |

(Continued)

OTHER PUBLICATIONS

Korean Office Action dated Nov. 17, 2015, issued in corresponding Korean Patent Application No. 10-2014-0180525.

*Primary Examiner* — Aaron L Troost
(74) *Attorney, Agent, or Firm* — McDermott Will & Emery LLP

(57) ABSTRACT

A method for providing a current location of a vehicle includes detecting and determining whether a smart key approaches the vehicle. Identification information of the smart key is received from the detected smart key. Information related to the current location is transmitted to an external device upon recognizing the inherent identification information to provide guidance to the current location of the vehicle through the external device.

7 Claims, 4 Drawing Sheets

(56) References Cited

FOREIGN PATENT DOCUMENTS

| | | |
|---|---|---|
| JP | 2006-033700 A | 2/2006 |
| JP | 2008-230296 A | 10/2008 |
| JP | 2014-025279 A | 2/2014 |
| JP | 5548542 A | 7/2014 |
| KR | 10-2009-0050372 A | 5/2009 |
| KR | 10-1017470 B1 | 2/2011 |
| KR | 10-1049538 B1 | 7/2011 |
| KR | 10-2012-0001438 A | 1/2012 |
| KR | 10-1128024 B1 | 3/2012 |
| KR | 10-2012-0084942 A | 7/2012 |
| KR | 10-2013-0033702 A | 4/2013 |
| KR | 10-1302828 B1 | 9/2013 |
| KR | 10-1337695 B1 | 12/2013 |
| KR | 10-2014-0088290 A | 7/2014 |

\* cited by examiner

METHOD FOR PROVIDING GUIDANCE TO LOCATION OF VEHICLE USING SMART GLASSES AND APPARATUS FOR CARRYING OUT THE SAME

CROSS REFERENCE TO RELATED APPLICATION

This application claims the benefit of Korean Patent Application No. 10-2014-0180525, filed on Dec. 15, 2014, which is hereby incorporated by reference as if fully set forth herein.

TECHNICAL FIELD

The present disclosure relates to a method for notifying a driver of a location of a parked vehicle using a smart device and an apparatus for the same.

BACKGROUND

A vehicle is provided with a smart key which allow a driver to lock or unlock a vehicle door by pressing a door lock or unlock button of the smart key. When the button is pressed, turn signals or headlights are turned on simultaneously with output of sound to visually and acoustically notify the driver of a location of the vehicle.

This intuitive and simple method is effective in a case in which the vehicle is located within a driver's field of vision. However, through this method, the headlights may often not be seen well in the daytime and may be hidden by other vehicles in a crowded parking lot. In addition, the sound output from the vehicle may often be difficult due to surrounding noises.

SUMMARY

The present disclosure is directed to a method for providing guidance to a location of a vehicle using smart device and an apparatus for carrying out the same that substantially obviate one or more problems due to limitations and disadvantages of the related art.

An aspect of the present inventive concept provides a method for allowing a driver to more easily find a parked vehicle and an apparatus for the same.

Additional advantages, objects, and features, of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with an embodiment of the inventive concept, a method for providing a current location of a vehicle includes detecting whether a smart key approaches the vehicle. Identification information of the smart key from the detected smart key. Information related to the current location is transmitted to an external device upon recognizing the inherent identification information to provide guidance to the current location of the vehicle through the external device.

In accordance with another embodiment of the present inventive concept, a vehicle location notification system for providing a current location of a vehicle includes a smart key recognizer configured to detect and determine whether a smart key approaches the vehicle and to receive identification information of the smart key from the detected smart key. A global positioning system (GPS) is configured to acquire information related to the current location of the vehicle. A wireless communicator is configured to exchange data with an external device. A controller is configured to control the wireless communicator to transmit the information related to the current location to the external device upon recognizing the inherent identification information to provide guidance to the current location of the vehicle through the external device.

In accordance with a further embodiment of the present inventive concept, smart glasses providing guidance to a location of a vehicle include a GPS configured to acquire a current location of the smart glasses. A wireless communicator is configured to receive vehicle location information from the vehicle, to request a connected external device for location correction information, and to receive the location correction information. A smart glasses controller is configured to correct the acquired current location using the location correction information and to compare the corrected current location with the received vehicle location information. A display is configured to display information indicating the location of the vehicle using a comparison result.

It is to be understood that both the foregoing general description and the following detailed description of the present inventive concept are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principle of the invention.

DETAILED DESCRIPTION

Figure 1:
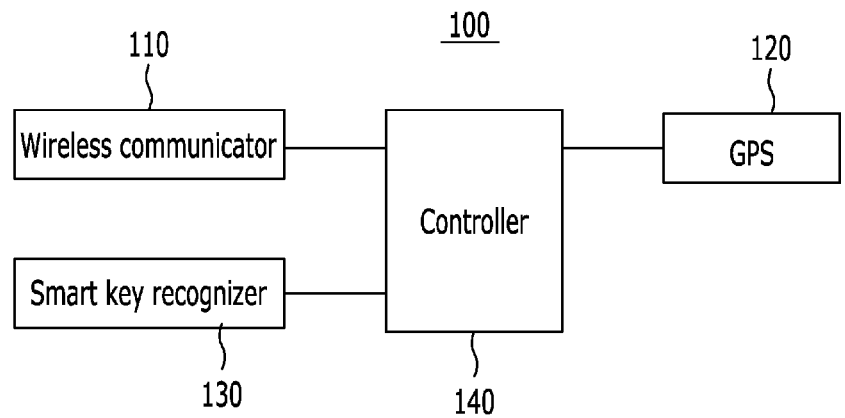
FIG. 1 is a block diagram illustrating an exemplary configuration of a location guide system of a vehicle according to an embodiment of the present inventive concept.

Hereinafter, reference will now be made in detail to exemplary embodiments of the present inventive concept, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description and thus can be used interchangeably and do not have any distinguishable meanings or functions.

In addition, in the following description of embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions included in the spirit and scope of the present disclosure.

According to the present disclosure, a vehicle senses driver's approach based on a signal from a smart key and transmits vehicle location information to smart glasses worn by a driver upon sensing the driver's approach, so as to visually provide the vehicle location information through the smart glasses to the driver.

More specifically, a vehicle senses that a smart key approaches the vehicle. The smart key receives an antenna signal of the vehicle and transmits identification information (code) thereof to the vehicle via a high frequency (e.g., ultra-high frequency (UHF)) band. Upon verifying that the smart key is a smart key of a driver based on the inherent identification information, the vehicle transmits current location information of the vehicle to preregistered smart glasses of the driver.

Descriptions will be given of an apparatus for carrying out exemplary embodiments of the present inventive concept.

FIG. 1 is a block diagram illustrating an exemplary configuration of a location guide system for a vehicle according to an embodiment of the present inventive concept.

Referring to FIG. 1, a location guide system 100 may include a wireless communicator 110 connected to a wearable device such as smart glasses (or a smart phone connected to the wearable device) via wireless communication protocols such as Bluetooth or Wi-Fi. A global positioning system (GPS) 120 acquires current location information. A smart key recognizer 130 detects a smart key and verifies a function code transmitted from the smart key. A controller 140 is configured to control the above-described components and performs determination and calculation required to carry out the embodiment. For example, the controller 140 may control the overall process of establishing a wireless data path with the wearable device and transmit the current location information acquired via the GPS 120 to the wearable device when the smart key recognizer 130 recognizes the smart key of a driver. In addition, the smart key recognizer 130 may include a low frequency (LF) band antenna and an ultra-high frequency (UHF) band antenna.

Figure 2:
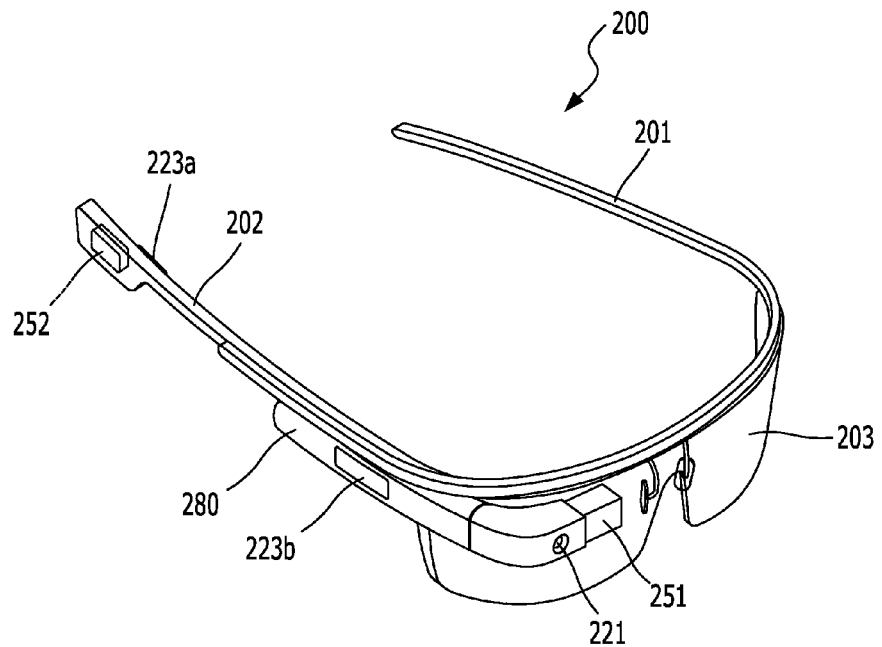
FIG. 2 is a view illustrating an example of smart glasses applicable to embodiments of the present inventive concept.

FIG. 2 is a view illustrating an example of smart glasses applicable to embodiments of the present inventive concept.

Smart glasses 200 are to be worn on a user's face. The smart glasses 200 may include a frame unit, e.g., a case or housing. The frame unit may be formed of a flexible material for easy wearing. FIG. 2 illustrates the frame unit including a first frame 201 and a second frame 202 formed of different materials.

The frame unit is supported by a head and has an internal space for installation of various components. As illustrated, electronic components such as a smart glasses controller 280 and a sound output 252 may be mounted to the frame unit. In addition, a lens 203 to cover at least one of the left eye and the right eye may be separably coupled to the frame unit.

A display 251 may be a head-mounted display (HMD). The HMD is worn on the user's face to display an image close to the user's eyes. Accordingly, the display unit 251 may be mounted to correspond to at least one of the left eye and the right eye. FIG. 2 illustrates the display 251 as corresponding to the right eye so as to output an image toward the right eye of the user.

The display 251 may project the image to the user's eye using a prism. In addition, the prism may be a transparent to allow the user to view both the projected image and a general forward visual range (i.e. a viewing range through the user's eyes).

As described above, the image output through the display 251 may overlap a general driver's field of vision. Accordingly, the smart glasses 200 may provide augmented reality-based guidance to the location of the vehicle.

A camera 221 is installed proximate to at least one of the left eye and the right eye to capture a forward image. The camera 221 may acquire an image that the user views.

Although FIG. 2 illustrates the camera 221 as being incorporated in the smart glasses controller 280, the position of the camera 221 is not limited thereto. The camera 221 may be installed to the frame unit, and a plurality of cameras may be used to acquire a stereoscopic image.

The smart glasses 200 may include command inputs 223a and 223b operated to receive a control command. The command inputs 223a and 223b may be operated by touch or push action.

The smart glasses controller 280 is configured to control a variety of electronic components mounted to the smart glasses 200. For example, the smart glasses controller 280 may obtain a wireless data path with the location guide system of the vehicle through a wireless communicator (not shown) of the smart glasses 200, and receive vehicle location information through the established data path so as to display navigation information for a corresponding location on the display 251. The smart glasses controller 280 may provide navigation to a location corresponding to the received vehicle location information using a location of the smart glasses 200 and a current view direction acquired via a geomagnetic sensor and a GPS (not shown) mounted to the smart glasses 200.

Although FIG. 2 illustrates the smart glasses controller 280 as being installed to one side of the frame unit around the head, the position of the smart glasses controller 280 is not limited thereto.

A description will be given below of provision of guidance to the location of a parked vehicle via the above-described location guide system of the vehicle and the smart glasses with reference to FIGS. 3A to 5.

Figure 3A:
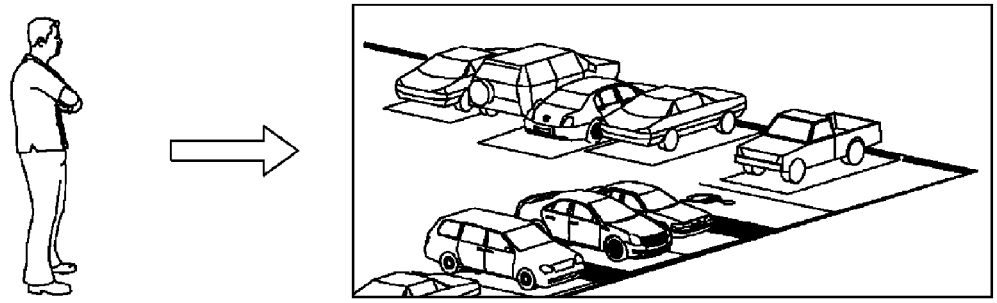
FIGS. 3A-3C are views illustrating an exemplary process of performing guidance to the location of a vehicle via the location guide system and a wearable device according to an embodiment of the present inventive concept.
Figure 3B:
Figure 3C:
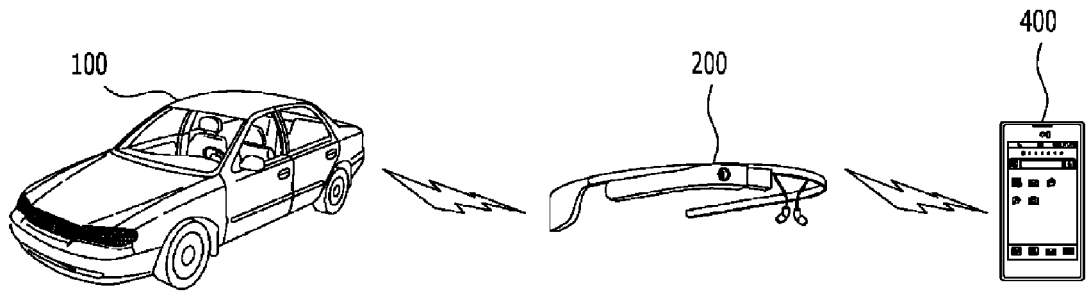

FIGS. 3A-3C is a view illustrating an exemplary process of performing guidance to the location of the vehicle via the location guide system and a wearable device according to an embodiment of the present inventive concept.

Referring to FIG. 3A, a driver who owns a smart key enters a parking lot. A vehicle does not need to be present in as parking lot according to the present disclosure, and driver's approach means that a distance between the smart key and the vehicle is gradually reducing within a communication range between the smart key and the vehicle.

Referring to FIG. 32B, the location guide system 100 of the vehicle senses a smart key 300 via an LF band antenna, and the smart key 300 transmits a function code thereof to the vehicle via a UHF band upon sensing an antenna signal of the vehicle 100.

When the location guide system 100 of the vehicle recognizes the received function code as the smart key 300 of the driver as illustrated in FIG. 3C, the location guide system 100 of the vehicle may transmit current location information thereof to the smart glasses 200 that are pre-registered to the driver. The smart glasses 200 may request a smartphone 400 of the driver for information for correction of a current location thereof (i.e. for acquisition of more accurate location information thereof). Accordingly, the smartphone 400 may provide the smart glasses 200 with, for example, acquired GPS information (e.g., A-GPS), Wi-Fi access point (AP) information, currently connected base station information, or location information determined by the aforementioned information.

In this way, the smart glasses 200 may provide a user with navigation to the vehicle using location information thereof and vehicle location information.

Hereinafter, the above-described process of FIGS. 3A-3C will be described again with reference to the flowchart of FIG. 4.

Figure 4:
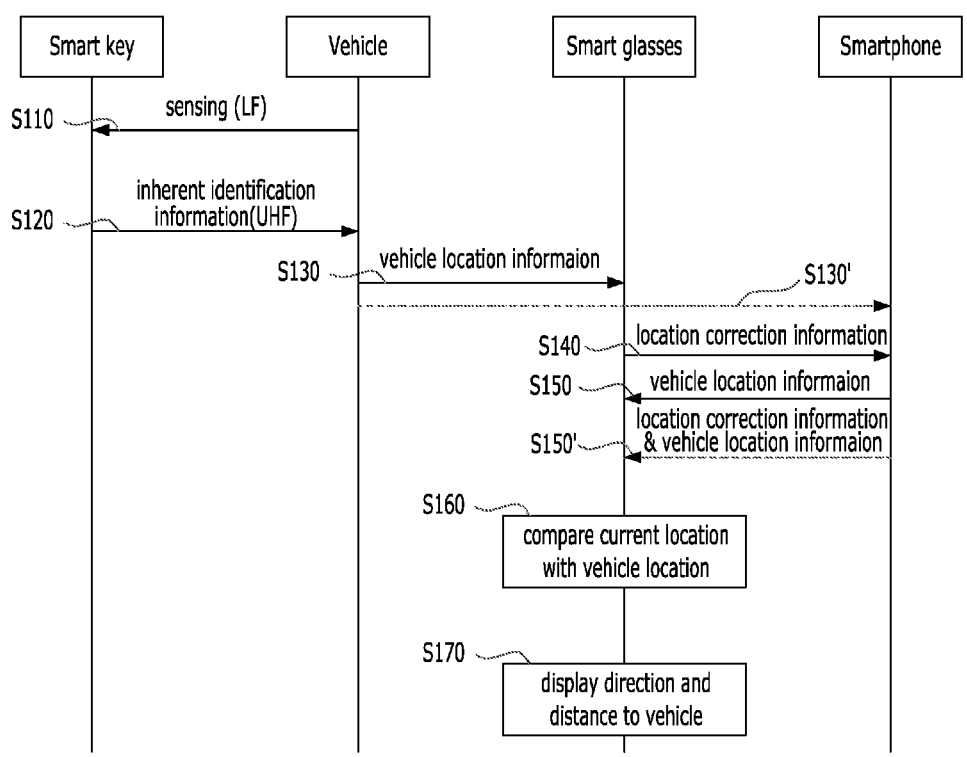
FIG. 4 is a flowchart illustrating an exemplary process of performing guidance to the location of a vehicle via the location guide system and a wearable device according to an embodiment of the present inventive concept.

FIG. 4 is a flowchart illustrating an exemplary process of performing guidance to the location of the vehicle via the location guide system and a wearable device according to an embodiment of the present inventive concept.

Referring to FIG. 4, the vehicle may sense a smart key 300 via an LF band antenna (S110). The smart key 300 receives an LF antenna signal and may transmit identification information thereof to the vehicle via a UHF band (S120). The vehicle may measure the intensity of the signal from the smart key 300 and determine whether the smart key 300 approaches the vehicle. The LF antenna signal may be periodically transmitted, or may be transmitted based on an event when a specific condition is satisfied (for example, when the signal is first received from the smart key 300 via the UHF band). In addition, to reduce power consumption, the vehicle may maintain only the smart key recognizes 130 being activated until the smart key 300 is sensed and thereafter activate the entire location guide system 100 from a point in time when the smart key 300 is sensed.

When the vehicle recognizes driver's approach based on the identification information of the smart key 300, the vehicle transmits vehicle location information to the smart glasses 200 (S130). To acquire a more accurate location thereof, the smart glasses 200 may request the smartphone for location correction information prior to providing the user with guidance to the location of the vehicle (S140), and receive the location correction information (S150). In addition, the smart glasses 200 may record coordinates of the user when the user moves in order to more accurately detect a location thereof.

Steps S140 and S150 may be omitted as needed. When the smart glasses 200 cannot autonomously perform wireless connection with the vehicle, the vehicle may transmit vehicle location information to the smartphone 400 connected to the smart glasses 200 (S130'). In this case, the smartphone 400 may transmit vehicle location information as well as location correction information to the smart glasses 200 (S150').

When the smart glasses 200 receives the vehicle location information, the smart glasses 200 may compare a current location thereof with the received vehicle location information (S160), and notify the user of the location of the vehicle by displaying, for example, a distance and direction to the location of the vehicle (S170). To detect the direction to the location of the vehicle, the smart glasses 200 may use a geomagnetic sensor (not shown) and may calculate variation in location thereof to calculate a movement direction of the user.

Figure 5:
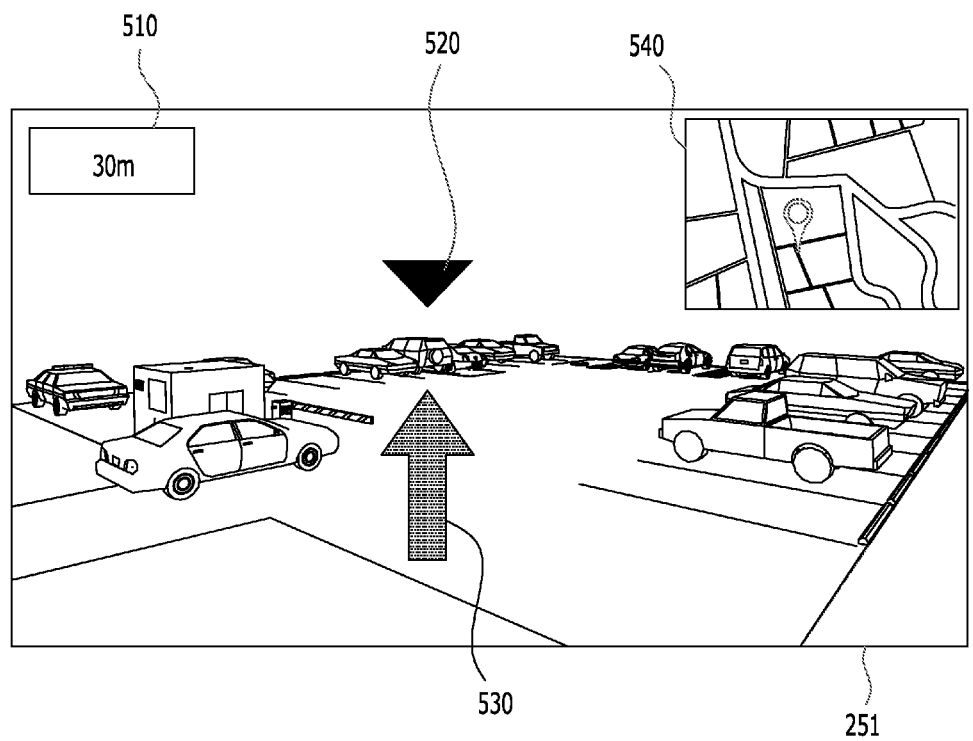
FIG. 5 is a view illustrating an exemplary method for visually indicating the location of a vehicle by smart glasses according to an embodiment of the present inventive concept.

FIG. 5 is a view illustrating an exemplary method for visually indicating the location of a vehicle by smart glasses according to an embodiment of the present inventive concept.

Referring to FIG. 5, information related to the location of the vehicle may be displayed on the display 251 of the smart glasses 200. More specifically, the display 251 may display, for example, a distance 510 to the vehicle, an indicator 520 indicating a direction to the vehicle regardless of any obstacle that blocks the user's sight, an arrow 530 indicating a recommended heading, and a surrounding map 540 over a real environment that the user views, in an augmented reality (AR) based manner. The above described display state and display manner of vehicle location information are given by way of example, and different information may be displayed.

As is apparent from the above description, the following effects are acquired according to at least one embodiment of the present inventive concept.

It is possible to allow a driver to more conveniently find a parked vehicle. In particular, through use of smart glasses, the location of the vehicle may be intuitively guided via visual information in an augmented reality manner.

It will be appreciated by persons skilled in the art that the effects that can be achieved through the present disclosure are not limited to what has been particularly described hereinabove, and other advantages of the present disclosure will be more clearly understood from the above detailed description.

The present disclosure as described above may be implemented as a computer readable code of a computer readable medium in which programs are recorded. The computer readable medium includes all kinds of recording devices in which data that may be read by a computer system is stored. Examples of the computer readable medium may include a hard disk drive (HDD), a solid state disk (SSD), a silicon disk drive (SDD), ROM, a RAM, a CD-ROM, a magnetic tape, a floppy disk, and an optical data storage device. In addition, the computer readable recording medium includes a carrier wave (e.g., data transmission over the Internet).

Accordingly, the above detailed description is not intended to be construed to limit the present disclosure in all aspects and be considered by way of example. The scope of the present inventive concept should be determined by reasonable interpretation of the accompanying claims and all equivalent modifications made without departing from the present inventive concept should be included in the following claims.

What is claimed is:

1. A method for providing a current location of a vehicle to a user's device, the method comprising steps of:
 detecting and determining whether a smart key approaches the vehicle;
 receiving identification information of the smart key from the detected smart key;
 transmitting information related to the current location of the vehicle to a wearable device upon recognizing the identification information to provide guidance to the current location of the vehicle through the wearable device; and
 transmitting the information related to the current location of the vehicle to a smartphone which is engaged with the wearable device when direct connection between the vehicle and the wearable device is impossible,
 wherein the wearable device includes: smart glasses, and
 wherein the smart glasses is configured to display, on a display of the smart glasses, an indicator indicating a position of the vehicle on a direction corresponding to the position regardless of any obstacle that blocks a user's sight.

2. The method according to claim 1, wherein in the step of detecting, the smart key is detected using a signal of a low frequency (LF) band.

3. The method according to claim 1, wherein in the step of receiving, the identification information is received via a signal of an ultra-high frequency (UHF) band.

4. A non-transitory computer-readable recording medium comprising computer executable instructions execution of which causes a controller to perform the method according to claim 1.

5. A vehicle location notification system for providing a current location of a vehicle to a user's device, the system comprising:
   a smart key recognizer configured to detect whether a smart key approaches the vehicle and to receive identification information of the smart key from the detected smart key;
   a global positioning system (GPS) configured to acquire information related to the current location of the vehicle;
   a wireless communicator configured to exchange data with a wearable device; and
   a controller configured to control the wireless communicator to transmit the information related to the current location of the vehicle to the wearable device upon recognizing the identification information to provide guidance to the current location of the vehicle through the wearable device, and to control the transmission of the information related to the current location of the vehicle to a smartphone which is engaged with the wearable device when direct connection between the vehicle and the wearable device is impossible,
   wherein the wearable device includes smart glasses, and
   wherein the smart glasses is configured to display, on a display of the smart glasses, an indicator indicating a position of the vehicle on a direction corresponding to the position regardless of any obstacle that blocks a user's sight.

6. The system according to claim 5, wherein the smart key recognizer includes a LF band antenna and a UHF band antenna.

7. The system according to claim 6, wherein the smart key recognizer is configured to:
   detect whether the smart key approaches the vehicle via the LF band antenna; and
   receive the identification information of the smart key via the UHF band antenna.

* * * * *